United States Patent
Ito (10) Patent No.: US 7,076,395 B2
(45) Date of Patent: Jul. 11, 2006

(54) ANGLE DETECTION APPARATUS AND TORQUE DETECTION APPARATUS

(75) Inventor: Akira Ito, Kariya (JP)

(73) Assignees: Favess Co., Ltd., Okazaki (JP); Toyoda Koki Kabushiki Kaisha, Kariya (JP); Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 11/143,897

(22) Filed: Jun. 3, 2005

(65) Prior Publication Data
US 2005/0273295 A1 Dec. 8, 2005

(30) Foreign Application Priority Data
Jun. 7, 2004 (JP) .............................. 2004-168516

(51) Int. Cl.
*G01C 9/00* (2006.01)

(52) U.S. Cl. ..................................................... 702/151

(58) Field of Classification Search ................. 702/151
See application file for complete search history.

(56) References Cited

U.S. PATENT DOCUMENTS

| 4,879,555 A | 11/1989 | Ichikawa et al. |
| 4,893,077 A | 1/1990 | Auchterlonie |
| 6,957,713 B1 * | 10/2005 | Tomita ........................ 180/446 |
| 2003/0046012 A1 * | 3/2003 | Yamaguchi ................... 702/36 |

FOREIGN PATENT DOCUMENTS

| EP | 0 795 738 A1 | 9/1997 |
| EP | 1 318 061 A2 | 6/2003 |
| EP | 1 424 264 A2 | 6/2004 |
| JP | 5-264292 | 10/1993 |
| JP | 05264292 | * 10/1993 |

* cited by examiner

*Primary Examiner*—John Barlow
*Assistant Examiner*—Cindy D. Khuu
(74) *Attorney, Agent, or Firm*—Oblon, Spivak, McClelland, Maier & Neustadt, P.C.

(57) ABSTRACT

An angle detection apparatus includes a resolver having a rotor core and a stator core, and a computation unit having a multiple rotation amount computation, accumulation and an abnormality determination sections. The rotor core moves along the axial direction of a steering shaft in response to rotation of the steering shaft. Based on a change of a transformation ratio of the resolver caused by a change of the relative positions of the rotor core and the stator core along the axial direction due to movement of the rotor core, the multiple rotation amount computation section computes a first multiple rotation amount N of the steering shaft. The multiple rotation amount accumulation section detects the switchover point of the absolute angle .theta.0 when the steering shaft is rotated a single rotation, and computes a second multiple rotation amount N' by accumulating the number of detection of the switchover point.

12 Claims, 4 Drawing Sheets

ANGLE DETECTION APPARATUS AND TORQUE DETECTION APPARATUS

CROSS-REFERENCE TO RELATED APPLICATIONS

This application is based upon and claims the benefit of priority from prior Japanese Patent Application No. 2004-168516, filed on Jun. 7, 2004, the entire contents of which are incorporated herein by reference.

BACKGROUND OF THE INVENTION

The present invention relates to an angle detection apparatus and a torque detection apparatus.

Japanese Laid-Open Patent Publication No. 5-264292 discloses an angle detection apparatus equipped with a resolver. A resolver is a rotary transformer, in which the magnetic relationship between a primary coil (excitation section) and a secondary coil (a sensor coil of an output section) changes. In the sensor coil of the output section, an output signal (voltage) is evoked that has an amplitude proportionate to the amplitude of an excitation signal inputted to the primary coil. The output signal is a function on a sine wave and very accurately represents a rotation angle.

A resolver type angle detection apparatus is an absolute angle detector that detects absolute rotation angles of a rotary shaft in a single rotation, or an absolute angle, based on output signal of the resolver. A resolver type angle detection apparatus can perform highly accurate detection through multi-polarization, and is characterized by its high durability and noise resistance because of the simple structure.

However, in the actual use environment of a resolver type angle detection apparatus, not only absolute angles of a rotary shaft in a single rotation, but also absolute angles in multiple rotations, or multiple rotation absolute angles need to be detected. For example, in a case of the steering apparatus of a vehicle, an absolute angle that corresponds to a turning angle of the steering wheel and is greater than or equal to a single rotation of the steering shaft (360°) needs to be detected.

However, since an output signal of a resolver corresponds to a turn within a single rotation of a rotary shaft as described above, a resolver type angle detection apparatus having an ordinary configuration cannot detect multiple rotation absolute angles of a rotary shaft. Thus, a plurality of resolvers need to be coupled to one another with gears when using resolvers for detecting multiple rotation absolute angle. As a result, the size and costs of the angle detection apparatus are increased.

In this respect, in a conventional vehicle steering apparatus, a resolver as described above is used together with an incremental detector that accumulates increase and decrease in the displacement amount of a rotary shaft, so that multiple rotation absolute angles are computed.

However, an incremental detector is generally susceptible to noise. Therefore, when accumulating displacement amount, the accumulated value of displacement amount might be significantly different from the actual value because of the influence of, for example, noise. Also, although a resolver basically has a superior noise resistance and durability, abnormalities such as broken wires and short circuits in coils may occur in the resolver. If such an abnormality occurs, the resolver cannot accurately detect multiple rotation absolute angles.

SUMMARY OF THE INVENTION

Accordingly, it is an objective of the present invention to provide an angle detection apparatus and a torque detection apparatus that are capable of determining occurrence of abnormalities at an early stage, and of highly accurately detecting multiple rotation absolute angles.

To achieve the foregoing and other objectives and in accordance with the purpose of the present invention, an angle detection apparatus having a resolver that has a transformation ratio is provided. Based on an output signal from the resolver, the angle detection apparatus detects an absolute angle of a rotary shaft that has a switchover point of absolute angles in a single rotation. The resolver includes a rotor core and a stator core. The rotor core rotates integrally with the rotary shaft and has a rotor coil. The rotor coil is excited with an excitation signal having a predetermined amplitude. The stator core is located outside the rotor core. A sensor coil is wound around the stator core. The sensor coil outputs an output signal having an amplitude that is proportionate to the amplitude of the excitation signal. The resolver is configured such that, in response to rotation of the rotary shaft, the relative positions of the rotor core and the stator core along an axial direction of the rotary shaft change. The transformation ratio is changed according to changes in the relative positions. The angle detection apparatus further includes a multiple rotation amount computation section, a multiple rotation amount accumulation section, and an abnormality determination section. The multiple rotation amount computation section computes a first multiple rotation amount of the rotary shaft based on a change in the transformation ratio. The multiple rotation amount accumulation section detects the switchover point, thereby accumulating a second multiple rotation amount of the rotary shaft. The abnormality determination section performs abnormality determination of the angle detection apparatus based on whether the first multiple rotation amount and the second multiple rotation amount are equal to each other.

The present invention also provides a detection apparatus for detecting an input torque applied to a rotary shaft having a switchover point of absolute angles in a single rotation based on output signals from first and second resolvers each having a transformation ratio. The rotary shaft includes first and second shaft portions and a torsion bar coupling the shaft portions to each other. The first resolver includes a first rotor core and a first stator core. The first rotor core rotates integrally with the first shaft portion and has a first rotor coil. The first rotor coil is excited with an excitation signal having a predetermined amplitude. The first stator core is located outside the first rotor core. A first sensor coil is wound around the first stator core. The first sensor coil outputs an output signal having an amplitude that is proportionate to the amplitude of the excitation signal. The first resolver is configured such that the relative positions of the first rotor core and the first stator core are fixed with respect to an axial direction of the first shaft portion. The second resolver includes a second rotor core and a second stator core. The second rotor core rotates integrally with the second shaft portion and has a second rotor coil. The second rotor coil is excited with the excitation signal common to the first resolver. The second stator core is located outside the second rotor core. A second sensor coil is wound around the second stator core. The second sensor coil outputs an output signal having an amplitude that is proportionate to the amplitude of the excitation signal. The second resolver is configured such that, in response to rotation of the second shaft portion, the relative positions of the second rotor core and the second stator core along an axial direction of the second shaft portion change. The transformation ratio of the second resolver is changed according to changes in the relative positions. The detection apparatus further includes a multiple rotation amount computation section, a multiple rotation amount accumulation section, and an abnormality determination section. The multiple rotation amount computation section computes a first multiple rotation amount of the rotary shaft based on a change in the transformation ratio of the second resolver. The multiple rotation amount accumulation section detects the switchover point, thereby accumulating a second multiple rotation amount of the rotary shaft. The abnormality determination section performs abnormality determination of the detection apparatus based on whether the first multiple rotation amount and the second multiple rotation amount are equal to each other. The detection apparatus detects a rotation angle of each shaft portion based on an output signal of the corresponding resolver. Based on the difference between the rotation angles of the shaft portions, the detection apparatus detects a rotation torque applied to the rotary shaft.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Hereinafter, a torque detection apparatus for an electric power steering (EPS) according to one embodiment of the present invention will be described with reference to the drawings.

(Basic Configuration of Torque Detection Apparatus and Torque Detection)

Figure 1:
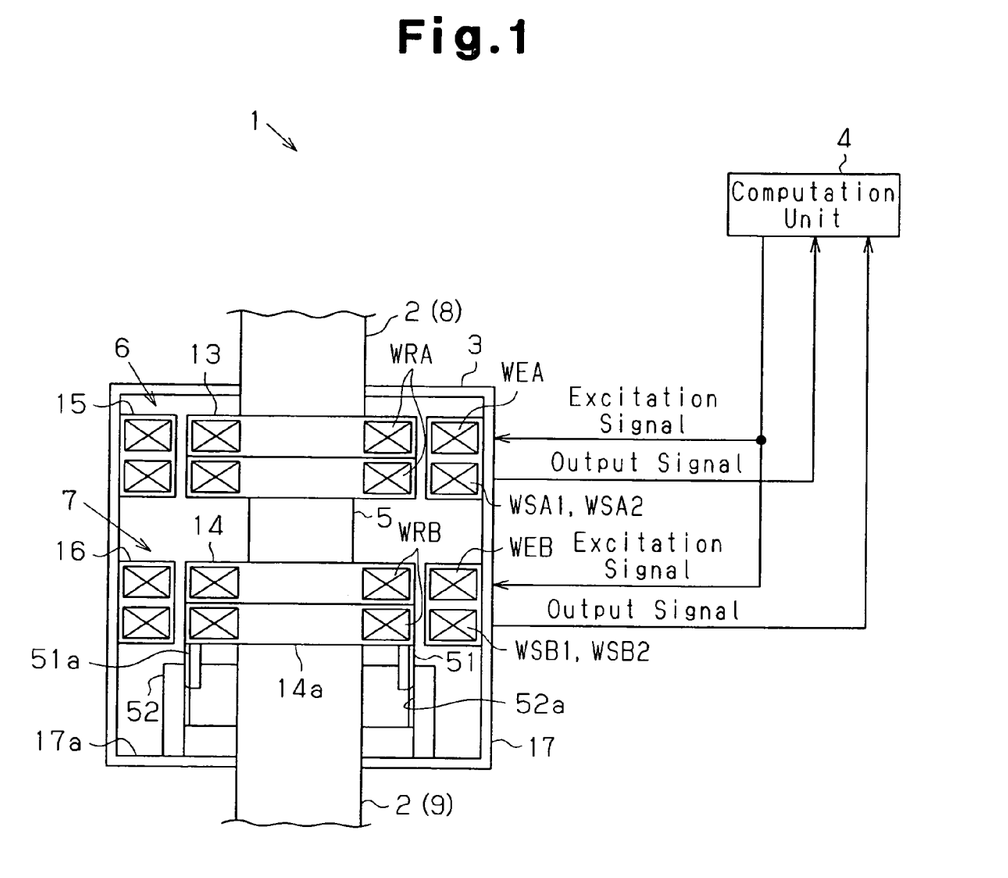
FIG. 1 is a diagram showing a torque detection apparatus according to one embodiment.
Figure 2:
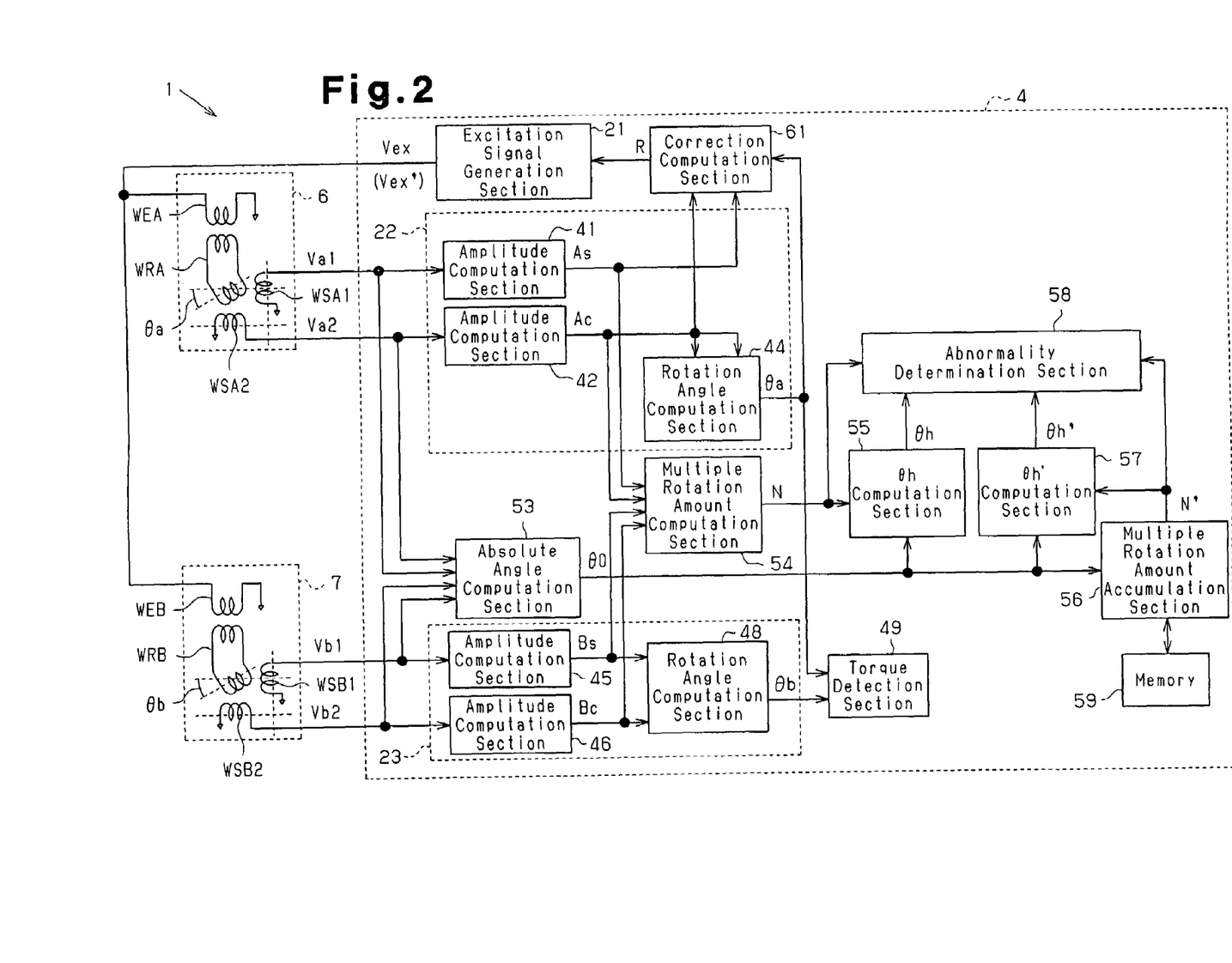
FIG. 2 is a block diagram showing the electric configuration of the torque detection apparatus.

FIG. 1 diagrammatically shows the configuration of the torque detection apparatus, and FIG. 2 shows the electrical configuration of the torque detection apparatus. As shown in FIG. 1, the torque detection apparatus 1 of this embodiment includes a torque sensor 3 provided on a steering shaft 2, and a computation unit 4 for detecting steering torque based on an output signal of the torque sensor 3. The steering shaft 2 transmits rotation of a steering wheel (not shown) to a rack-and-pinion mechanism (not shown).

The torque sensor 3 includes a torsion bar 5, and first and second resolvers 6, 7. The steering shaft 2 is formed of a first shaft portion 8 that extends toward the steering wheel (input section) and a second shaft portion 9 that extends toward the rack-and-pinion mechanism. One end of the torsion bar 5 is fixed to the first shaft portion 8, and the other end of the torsion bar 5 is fixed to the second shaft portion 9. The first resolver 6 is provided on the first shaft portion 8, and the second resolver 7 is provided on the second shaft portion 9. The resolvers 6, 7 sandwich the torsion bar 5.

The resolvers 6, 7 each include rotor core 13, 14 and an annular stator core 15, 16, respectively. The rotor cores 13, 14 rotate integrally with the first shaft portion 8 and the second shaft portion 9, respectively. The stator cores 15, 16 are each provided outward of and surround the corresponding one of the rotor cores 13, 14. The stator cores 15, 16 are fixed to a housing 17 of the torque sensor 3 so as not to rotate.

The resolvers 6, 7 of this embodiment are single-phase excitation and two-phase output type resolvers each having sensor coils of two phases (sin phase and cos phase). The axes of the coils of different phases are perpendicular to each other. Specifically, about each of the stator cores 15, 16, a set of sensor coils WSA1, WSA2, WSB1, and WSB2 are wound. About each of the rotor cores 13, 14, rotor coils WRA, WRB are wound.

About each of the stator cores 15, 16 of this embodiment, excitation coils WEA, WEB are wound for exciting the rotor coils WRA, WRB. The rotor coils WRA, WRB are excited by supplying an excitation signal having a predetermined amplitude (sine wave alternating current signal) to the excitation coils WEA, WEB. Excitation of the rotor coils WRA, WRB evokes output signals (voltage) having an amplitude proportionate to the amplitude of the excitation signal in the sensor coil WSA1, WSA2, WSB1, and WSB2. In this embodiment, the resolvers 6, 7 have the same transformation ratio k.

As shown in FIG. 2, the excitation coils WEA, WEB of the resolvers 6, 7, and the sensor coil WSA1, WSA2, WSB1, and WSB2 are connected to the computation unit 4. The computation unit 4 outputs excitation signals Vex to the excitation coils WEA, WEB and detects a rotation angle θa of the first shaft portion 8 and a rotation angle θb of the second shaft portion 9 based on output signals from the sensor coil WSA1, WSA2, WSB1, and WSB2 through computation. Then, based on the difference between the rotation angle θa and the rotation angle θb, or a twist amount of the torsion bar 5, and the spring constant of the torsion bar 5, the computation unit 4 detects steering torque through computation.

Specifically, the computation unit 4 includes an excitation signal generation section 21 for generating the excitation signals Vex, a first rotation angle detection section 22, and a second rotation angle detection section 23. The first rotation angle detection section 22 computes the rotation angle θa of the first shaft portion 8 based on an output signal of the first resolver 6, and the second rotation angle detection section 23 computes the rotation angle θb of the second shaft portion 9 based on an output signal from the second resolver 7.

The excitation signal generation section 21 generates the excitation signals Vex having a predetermined amplitude based on excitation synchronizing signals from a timing generation section (not shown), or a command from the timing generation section. The excitation signal generation section 21 then outputs the excitation signals Vex to the excitation coil WEA of the first resolver 6 and the excitation coil WEB of the second resolver 7. That is, in this embodiment, the rotor coils WRA, WRB of the resolvers 6, 7 are excited by the common excitation signals Vex.

When the rotor coils WRA, WRB are excited, the sensor coils WSA1, WSA2 of the first resolver 6 output a sin phase output signal Va1 and a cos phase output signal Va2, which correspond to the rotation angle θa of the first shaft, and the sensor coils WSB1, WSB2 of the second resolver 7 output a sin phase output signal Vb1 and a cos phase output signal Vb2 that correspond to the rotation angle θb of the second shaft. Each output signal of the first resolver 6 is inputted to the first rotation angle detection section 22, and each output signal of the second resolver 7 is inputted to the second rotation angle detection section 23.

The first rotation angle detection section 22 includes amplitude computation sections 41, 42 and a rotation angle computation section 44. The amplitude computation section 41 computes an amplitude As of the sin phase output signal Va1, and the amplitude computation section 42 computes an amplitude Ac of the cos phase output signal Va2. The rotation angle computation section 44 computes the rotation angle θa of the first shaft portion 8 based on the amplitudes As, Ac of the output signals computed by the amplitude computation sections 41, 42.

Likewise, the second rotation angle detection section 23 includes amplitude computation sections 45, 46 and a rotation angle computation section 48. The amplitude computation section 45 computes the amplitude Bs of the sin phase output signal Vb1, and the amplitude computation section 46 computes the amplitude Bc of the cos phase output signal Vb2. The rotation angle computation section 48 computes the rotation angle θb of the second shaft portion 9 based on the amplitudes Bs, Bc of the output signals computed by the amplitude computation sections 45, 46.

More specifically, since the first and second resolvers 6, 7 are single-phase excitation and two-phase output type resolvers, in the first resolver 6, for example, the amplitude Vs of the excitation signal Vex, the amplitudes As, Ac of the phases satisfy the following equations.

$$As = k \times Vs \times \sin \theta a \quad (1)$$

$$Ac = k \times Vs \times \cos \theta a \quad (2)$$

That is, the amplitude As of the sin phase output signal Va1 and the amplitude Ac of the cos phase output signal Va2 are values proportionate to the sinusoidal component (sin θa) and the cosine component (cos θa) of the rotation angle θa. The rotation angle computation section 44 computes the rotation angle θa of the first shaft portion 8 based on the relationship represented by the equations (1), (2).

Likewise, the rotation angle computation section 48 computes the rotation angle θb of the second shaft portion 9 according to the following equations.

$$Bs = k \times Vs \times \sin \theta b \quad (3)$$

$$Bc = k \times Vs \times \cos \theta b \quad (4)$$

The first rotation angle detection section 22 and the second rotation angle detection section 23 each output the rotation angle θa of first shaft portion 8 and the rotation angle θb of the second shaft portion 9 computed by the rotation angle computation sections 44, 48 to the torque detection section 49. The torque detection section 49 multiplies the difference between the rotation angles θa, θb by the spring constant of the torsion bar 5, thereby computing the steering torque.

(Detection of Multiple Rotation Absolute Angle)

Next, the detection of absolute angles by the torque detection apparatus of the present invention will be described. In addition to the steering torque detecting function described above, the torque detection apparatus 1 of this embodiment has a function for detecting multiple rotation absolute angles. The function for detecting multiple rotation absolute angles permits an absolute rotation angle over multiple rotations of the steering shaft 2 to be detected when the steering shaft 2 is rotated in steering operation. In other words, multiple rotation absolute angles that are greater than or equal to 360° can be detected.

As shown in FIG. 1, the rotor core 14 of the second resolver 7 is coupled to the second shaft portion 9. The rotor core 14 also rotates integrally with the second shaft portion 9, and slides along the axial direction. On a lower end 14a of the rotor core 14, a cylindrical threaded portion 51 is formed. A thread ridge is formed on a circumference 51a of the threaded portion 51. A cylindrical threaded member 52 is formed on a bottom 17a of the housing 17. The threaded member 52 is concentric with the rotor core 14. A thread groove is formed on a circumferential surface 52a of the threaded member 52. The threaded portion 51 of the rotor core 14 and the threaded member 52 of the housing 10 are meshed with each other.

Figure 3A:
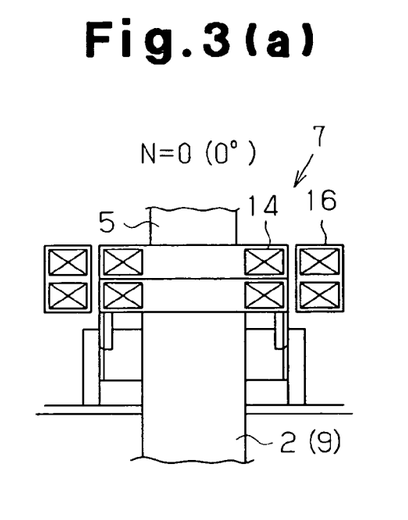
FIGS. 3(a) and 3(b) are diagrams for explaining operation of a second resolver.
Figure 3B:
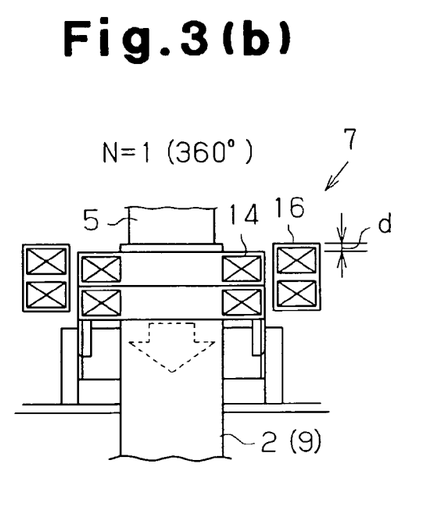

As shown in FIGS. 3(a) and 3(b), the rotor core 14 of the second resolver 7 moves in the axial direction by a predetermined distance d per rotation (360°) of the steering shaft 2 when the steering shaft 2 is rotated.

Movement of the rotor core 14 along the axial direction changes the relative positions of the rotor core 14 and the stator core 16 in the axial direction. According to the distance of the movement of the rotor core 14, the transformation ratio kb of the second resolver 7 changes. More specifically, the more the steering shaft 2 rotates and the greater the distance of the movement of the rotor core 14, the smaller the transformation ratio kb of the second resolver 7 becomes. Accordingly, the rate (rate of change) of the transformation ratio after the movement to the transformation ratio (specific transformation ratio k0) of a state where the rotor core 14 has not been moved is reduced (see FIG. 4).

The computation unit 4 of this embodiment detects a rate of change γ of the transformation ratio kb of the second resolver 7 based on the amplitudes Bs, Bc of the output signals of the respective phases of the second resolver 7, and the amplitudes As, Ac of the output signals of the respective phase of the first resolver 6. Then, based on the rate of change γ, the computation unit 4 computes a first multiple rotation amount N (N=0, 1, 2, 3, 4) of the steering shaft 2. Based on the first multiple rotation amount N and the absolute angle θ0 of the steering shaft 2 within a single rotation (0°–359°), the computation unit 4 computes a first multiple rotation absolute angle θh.

As shown in FIG. 2, the computation unit 4 includes an absolute angle computation section 53 and a multiple rotation amount computation section 54. The absolute angle computation section 53 computes the absolute angle θ0 of the steering shaft 2 within a single rotation. The multiple rotation amount computation section 54 computes the first multiple rotation amount N of the steering shaft 2. The absolute angle computation section 53 of this embodiment comprises an absolute angle detection means.

The absolute angle computation section 53 inputs output signals of the first resolver 6 and output signals of the second resolver 7. Based on the relationship among the electrical angles of the output signals of the first resolver 6 and the electrical angle of the output signal of the second resolver 7, the absolute angle computation section 53 computes the absolute angle θ0 of the steering shaft 2 within a single rotation.

The first resolver 6 of this embodiment is a quintuple type resolver that produces a fivefold axial angle. That is, the output signal of each phase of the first resolver 6 has an electrical angle that is fivefold of a mechanical angle (360°) that corresponds to rotation of the rotor core 13 (first shaft portion 8). The second resolver 7 is a sextuple type resolver that produces a sixfold axial angle. That is, the output signal of each phase of the second resolver 7 has an electrical angle that is sixfold of a mechanical angle that corresponds to rotation of the rotor core 14 (second shaft portion 9).

The multiple rotation amount computation section 54 receives the amplitudes As, Ac of the output signals of the respective phases of the first resolver 6 computed in the first rotation angle detection section 22, and the amplitudes Bs, Bc of the output signals of the respective phases of the second resolver 7 computed in the second rotation angle detection section 23.

Subsequently, the multiple rotation amount computation section 54 obtains the ratio of the sum of squares of the amplitudes As, Ac of the output signals of the respective phases of the first resolver 6, and the sum of squares of the amplitudes Bs, Bc of the output signals of the respective phases of the second resolver 7, thereby computing the rate of change γ of the transformation ratio kb of the second resolver 7.

More specifically, as indicated by the above equations (1)–(4), the amplitudes As, Bs of the sin phase output signal Va1, Vb1 of the resolvers 6, 7 are each a value that is proportionate to the sinusoidal component (sin θa, sin θb) of the rotation angle θa, θb. The amplitudes Ac, Bc of the cos phase output signals Va2, Vb2 of the resolvers 6, 7 are proportionate to the cosine components (cos θa, cos θb) of the rotation angles θa, θb, respectively. The sinusoidal component and cosine component in the rotation angle θ satisfy the following equation.

$$\sin\theta^2 + \cos\theta^2 = 1 \quad (5)$$

"^2" means raised to the power of 2 (the same applies in the following paragraphs).

Therefore, the amplitudes As, Ac of the output signals of the respective phases of the first resolver 6, the amplitudes Bs, Bc of the output signals of the respective phases of the second resolver 7 satisfy the following equations.

$$As^2 + Ac^2 = \alpha^2 = \text{constant} \quad (6)$$

$$Bs^2 + Bc^2 = \beta^2 = \text{constant} \quad (7)$$

The symbol "α" represents the maximum amplitude of the sin phase output signal Va1 and the cos phase output signal Va2 of the first resolver 6, that is, the maximum value of the amplitudes As, Ac. The symbol "β" represents the maximum amplitude of the sin phase output signal Vb1 and the cos phase output signal Vb2 of the second resolver 7, that is, the maximum value of the amplitudes Bs, Bc.

The transformation ratios ka, kb of the resolvers 6, 7 are the same (specific transformation ratio k0), and the resolvers 6, 7 are excited by the excitation signals Vex. The transformation ratio kb of the second resolver 7 changes according to movement of the rotor core 14 in the axial direction, which corresponds to rotation of the steering shaft 2. On the other hand, since the rotor core 13 does not move in the axial direction in response to rotation of the steering shaft 2, and the relative positions of the rotor core 13 and the stator core 15 are not changed, the transformation ratio ka of the first resolver 6 does not change.

That is, the sum of squares of the output signals of the respective phases of the resolvers 6, 7 remains constant as long as the transformation ratio kb of the second resolver 7 does not change in response to movement of the rotor core 14 of the second resolver 7 along the axial direction. Accordingly, the ratio of sum of squares of the output signal of the respective phases of the resolvers 6, 7 is changed only in response to movement of the rotor core 14 along the axial direction. Therefore, movement of the rotor core 14 along the axial direction, that is, the rate of change γ of the transformation ratio kb of the second resolver 7 that corresponds to rotation of the steering shaft 2, is computed based on the ratio (β^2/α^2) of the sum of squares of the amplitudes As, Ac of the output signals of the respective phases of the first resolver 6, and the sum of squares of the amplitudes Bs, Bc of the output signals of the respective phases of the second resolver 7.

In addition, since the transformation ratios ka, kb of the resolvers 6, 7 are the same (specific transformation ratio k0), the rates of change of the transformation ratio of the resolvers 6, 7 are substantially the same when the transformation ratio k of the resolvers 6, 7 is changed due to a temperature change. Thus, highly accurate detection is performed regardless of temperature changes.

Figure 4:
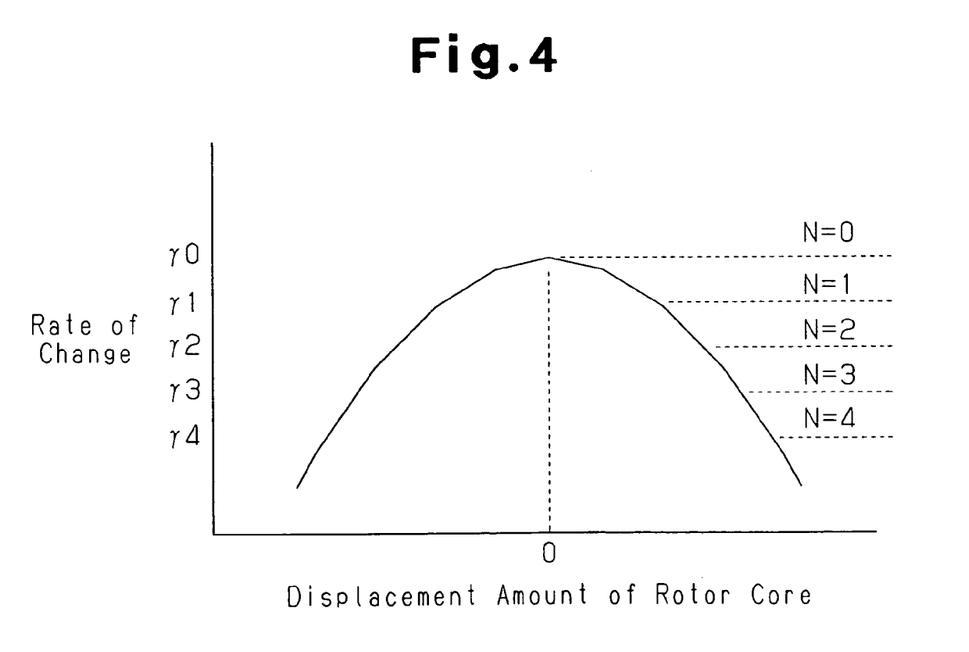
FIG. 4 is a graph showing the relationship among the displacement amount of a rotor core, the rate of change of a transformation ratio, and a multiple rotation amount of a steering shaft.

Next, based on the rate of change γ of the transformation ratio kb computed in the above manner, the multiple rotation amount computation section 54 computes the first multiple rotation amount N of the steering shaft 2. More specifically, as shown in FIG. 4, a plurality of threshold values γ0–γ4 each corresponding to a specific value of the first multiple rotation amount N of the steering shaft 2 are set in advance for the rate of change γ of the transformation ratio kb. The multiple rotation amount computation section 54 compares the value of the rate of change γ of the transformation ratio kb with the threshold values γ0–γ4, thereby computing the first multiple rotation amount N of the steering shaft. For example, if the computed value of the rate of change γ of the transformation ratio kb is between the threshold value γ2 and the threshold value γ3, the first multiple rotation amount N is computed to be 2 (N=2, 720°)).

As shown in FIG. 2, the first multiple rotation amount N computed by the multiple rotation amount computation section 54 is sent to the computation section 55 (θh computation section 55) together with the absolute angle θ0 within a single rotation computed by the absolute angle computation section 53. The θh computation section 55 comprises first computation means, and computes the first multiple rotation absolute angle θh. (US: The θh computation section 55 computes the first multiple rotation absolute angle θh.)

$$\theta h = \theta 0 + 2\Pi \times N \quad (8)$$

(Abnormality Determination)

Abnormality determination performed by the torque detection apparatus according to the present embodiment will now be described. As shown in FIG. 2, the computation unit 4 of the present embodiment includes a multiple rotation amount accumulation section 56 that accumulates a second multiple rotation amount N' of the steering shaft 2, a computation section 57 (θh' computation section 57) that computes a second multiple rotation absolute angle θh', and an abnormality determination section 58. The θh' computation section 57 comprises second computation means, and computes the second multiple rotation absolute angle θh' based on the second multiple rotation amount N'. (US: The θh' computation section 57 computes the second multiple rotation absolute angle θh' based on the second multiple rotation amount N'.) The abnormality determination section 58 performs abnormality determination of the torque sensor 3 based on the second multiple rotation amount N' and the second multiple rotation absolute angle θh'.

The multiple rotation amount accumulation section 56 inputs the absolute angle θ0 within a single rotation computed by the absolute angle computation section 53. The multiple rotation amount accumulation section 56 detects the switchover point of the absolute angle θ0 when the steering shaft 2 is rotated one turn, that is, a point where the angle is switched from 359° to 0° or from 0° to 359°. Then, the multiple rotation amount accumulation section 56 adds value representing the detection of the switchover point to the second multiple rotation amount N' detected in the previous process, that is, adds 1 or −1 to the previous value of the second multiple rotation amount N' according to the rotation direction of the steering shaft 2, thereby computing a new value of the second multiple rotation amount N'.

In this embodiment, the second multiple rotation amount N' computed by the multiple rotation amount accumulation section 56 is stored in a memory 59. Every time detecting the switchover point, the multiple rotation amount accumulation section 56 reads out the previous value of the second multiple rotation amount N' from the memory 59 and accumulates the read values. Then, the multiple rotation amount accumulation section 56 stores a new accumulated value of the second multiple rotation amount N' into the memory 59.

The θh' computation section 57 inputs the absolute angle θ0 computed by the absolute angle computation section 53, and the second multiple rotation amount N' computed by the multiple rotation amount accumulation section 56. Then, θh' computation section 57 computes the second multiple rotation absolute angle θh' of the steering shaft 2 using the following equation.

$$\theta h' = \theta 0 + 2\Pi \times N' \quad (9)$$

The second multiple rotation amount N' computed by the multiple rotation amount accumulation section 56 and the second multiple rotation absolute angle θh' computed by the θh' computation section 57 are inputted to the abnormality determination section 58, together with the first multiple rotation amount N computed by the multiple rotation amount computation section 54 and the first multiple rotation absolute angle θh computed by the θh computation section 55. Based on the inputted first and second multiple rotation amounts N, N', and the first and second multiple rotation absolute angles θh, θh', the abnormality determination section 58 performs the abnormality determination of the torque sensor 3.

Figure 5:
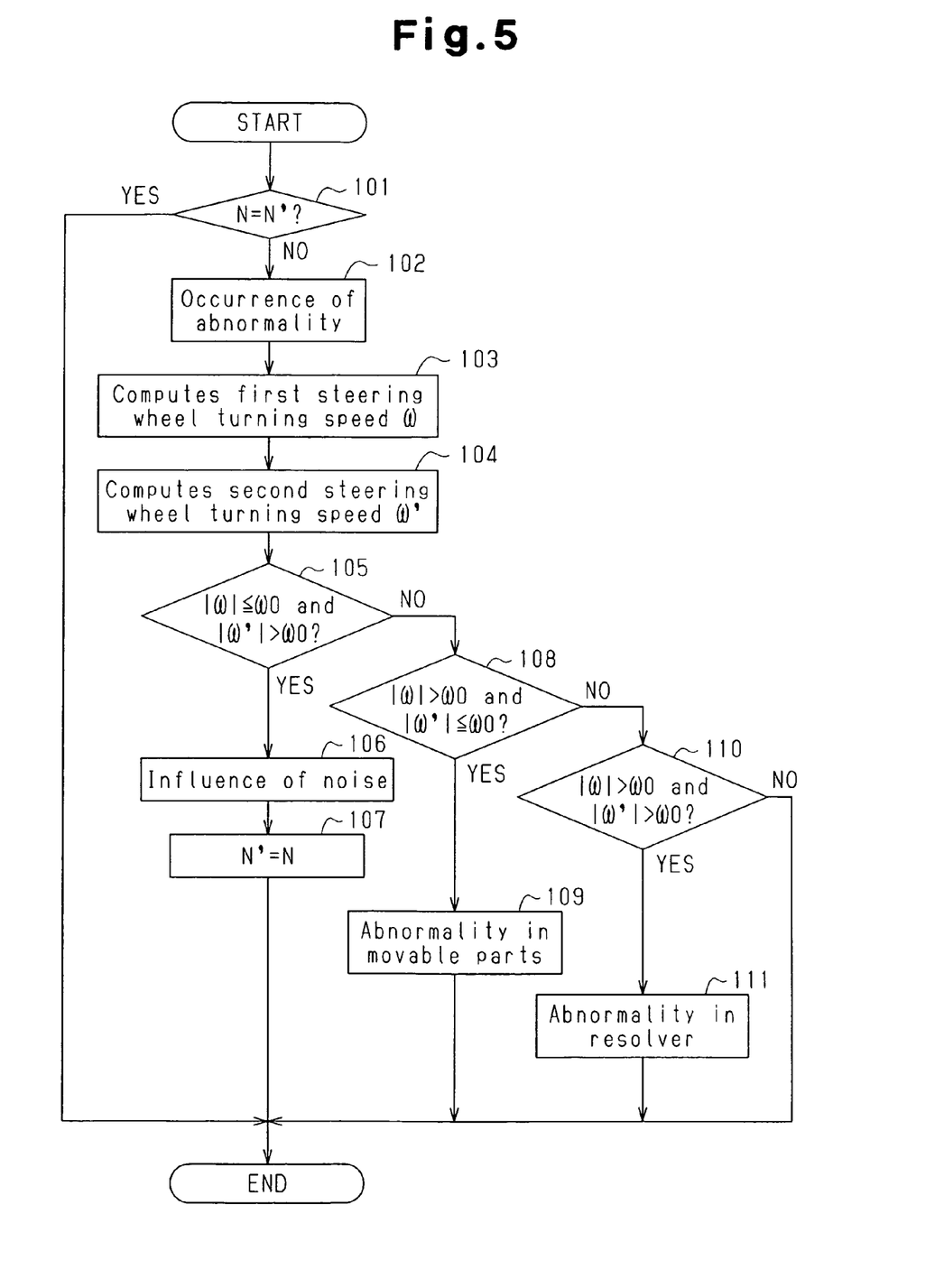
FIG. 5 is a flowchart showing an abnormality determination process.

The flowchart of FIG. 5 shows the procedure of the abnormality determination in an abnormality determination section. As shown in FIG. 5, the abnormality determination section 58 first determines whether the first multiple rotation amount N, which has been computed based on the rate of change of the transformation ratio kb due to movement of the rotor core 14 along the axial direction, is equal to the first multiple rotation amount N', which has been computed by accumulating the values representing the detection of the switchover point of the absolute angle θ0 within a single rotation (N=N', step 101).

If the first multiple rotation amount N is not equal to the second multiple rotation amount N' (step 101: NO), the abnormality determination section 58 determines that an abnormality has occurred in the torque sensor 3 (step 102). If the first multiple rotation amount N is equal to the second multiple rotation amount N' (step 101: YES), the abnormality determination section 58 determines that the torque sensor 3 is functioning normally and does not execute step 102 and subsequent processes.

Next, based on the first multiple rotation absolute angle θh inputted from the θh computation section 55, the abnormality determination section 58 computes a first steering wheel turning speed ω, which is angular velocity of the first multiple rotation absolute angle θh(step 103). Subsequently, based on the second multiple rotation absolute angle θh' inputted from the θh' computation section 57, the abnormality determination section 58 computes a second steering wheel turning speed ω', which is angular velocity of the second multiple rotation absolute angle θh' (step 104).

Then, the abnormality determination section 58 determines whether the absolute values of the first steering wheel turning speed ω and the second steering wheel turning speed ω' computed at step 103, 104 are each greater than a predetermined threshold value ω0. According to the combination of the determination results, the abnormality determination section 58 identifies the cause of the abnormality (location of abnormality).

Since the torque sensor 3 of this embodiment is for an EPS, the threshold value ω0 is set to the maximum value that can generally occur in an EPS (for example, 2292 deg/s (40 rad/s), assuming that the determination cycle is 5 ms, approximately 11.5 deg for each cycle, including reverse input due to collision with a curb).

More specifically, the abnormality determination section 58 first determines whether the absolute value of the first steering wheel turning speed ω is less than or equal to the threshold value ω0, and the absolute value of the second steering wheel turning speed ω' is greater than the threshold value ω0 (step 105). If the absolute values of the first and second steering wheel turning speeds ω, ω' meet a determination condition (|ω|≦ω0, and |ω'|>ω0, step 105: YES), the abnormality determination section 58 determines that the second multiple rotation absolute angle θh' has an abnormal value due to the influence of noise (step 106).

That is, since the absolute value of the first steering wheel turning speed ω has a normal value (|ω|≦ω0), the absolute angle θ0 within a single rotation, which is commonly used in the computation of the first multiple rotation absolute angle θh and the second multiple rotation absolute angle θh', is presumed to be normal. When accumulating the second multiple rotation amount N', which is the basis of the computation of the second multiple rotation absolute angle θh', the accumulation value of the second multiple rotation amount N' can be greatly differed from the actual value due to the influence of noise. Thus, when only the absolute value of the second steering wheel turning speed ω' based on the second multiple rotation absolute angle θh' has an abnormal value (|ω'|>ω0), it is determined that the second multiple rotation absolute angle θh', which is the basis for computing the second steering wheel turning speed ω', has an abnormal value due to the influence of noise.

If the influence of noise is determined to be the cause of abnormality at step 106, the abnormality determination section 58 resets the second multiple rotation amount N' to the first multiple rotation amount N, which has been computed based on the rate of change γ of the transformation ratio kb due to movement of the rotor core 14 along the axial direction, that is, to make the equation N'=N satisfied, thereby renewing the value of the second multiple rotation amount N' stored in the memory 59 (step 107).

On the other hand, if the absolute values of the first and second steering wheel turning speeds ω, ω' do not meet the determination condition (|ω|≦ω0, and |ω'|>ω0) at step 105 (step 105: NO), the abnormality determination section 58 determines whether the absolute value of the first steering wheel turning speed ω is greater than the threshold value ω0, and the absolute value of the second steering wheel turning speed ω' is less than or equal to the threshold value ω0 (step 108). If the absolute values of the first and second steering wheel turning speeds ω, ω' meet the condition (|ω|>ω0, and |ω'|≦ω0, step 108: YES), the abnormality determination section 58 determines that there is an abnormality in movable members that move the second resolver 7, specifically, the rotor core 14 along the axial direction (step 109).

That is, since the absolute value of the second steering wheel turning speed ω' has a normal value (|ω'|≦ω0), it is presumed that, as in the above case, the absolute angle θ0 within a single rotation has a normal value, and the first multiple rotation amount N, which is computed based on the rate of change γ of the transformation ratio kb due to movement of the rotor core 14 along the axial direction, has an abnormal value. Then, since the absolute angle θ0 is normal, and the first multiple rotation amount N is abnormal, it is determined that movement of the rotor core 14 along the axial direction does not correspond to rotation of the steering shaft 2, that is, there is an abnormality in the movable members that move the rotor core 14 along the axial direction.

On the other hand, if the absolute value of the first and second steering wheel turning speeds ω, ω' do not meet the determination condition (|ω|>ω0, and |ω'|≦ω0) at step 108 (step 108: NO), the abnormality determination section 58 determines whether the absolute values of the first and second steering wheel turning speeds ω, ω' are both greater than the threshold value ω0 (step 110). When the absolute values of the first and second steering wheel turning speeds ω, ω' meet the condition (|ω|>ω0, and |ω'|>ω0, step 110: YES), the abnormality determination section 58 determines that there is an abnormality in at least one of the first resolver 6 and the second resolver 7 (step 111). Specifically, the abnormality determination section 58 determines that there is a break or a short circuit in coils of the first resolver 6 or the second resolver 7.

That is, since the absolute values of the first and second steering wheel turning speeds ω, ω' both have an abnormal value, it is presumed that the absolute angle θ0 within a single rotation, which is commonly used for computing the first and second multiple rotation absolute angles θh, θh', has an abnormal value. Therefore, the output signals from the resolvers 6, 7, which are used for computing the absolute angle θ0 within a single rotation, already has an abnormal value, and an abnormality such as a broken wire or a short circuit has occurred in the first resolver 6 or the second resolver 7.

At step 110, the case where the absolute values of the first and second steering wheel turning speeds ω, ω' do not meet the condition (|ω|>ω0, and |ω'|>ω0, step 110: NO) does not usually occur since, if this is the case, the determination result of step 110 would contradict the determination result of step 101 (the condition N=N' not being met). Therefore, in such a case, it is presumed that the computation unit 4 has an abnormality.

(Correction of Excitation Signal)

Correction of excitation signals in the torque detection apparatus of this embodiment will now be described. The computation unit 4 of this embodiment has a correction function for excitation signals. The correction function for excitation signals permits the excitation signal Vex outputted to the excitation coils WEA, WEB of the resolvers 6, 7 to be corrected, such that the maximum amplitudes α, β of the output signals of the respective phases outputted from the resolvers 6, 7 are constant when the transformation ratio k of the resolvers 6, 7 changed due to a temperature change.

As shown in FIG. 2, the computation unit 4 includes a correction computation section 61 of the excitation amplitude for computing a correction factor R that is used for correcting the excitation signal Vex. The correction computation section 61 receives the amplitude As of the sin phase output signal Va1 of the first resolver 6, and the amplitude Ac of the cos phase output signal Va2, which have been computed by the first rotation angle detection section 22. Based on the amplitudes As, Ac of the output signals of the respective phases of the first resolver 6, the correction computation section 61 computes the correction factor R, and outputs the correction factor R to the excitation signal generation section 21.

The excitation signal generation section 21 multiplies the excitation signal Vex by the correction factor R, thereby correcting the excitation signal Vex. The excitation signal generation section 21 then outputs the corrected excitation signal Vex' to the excitation coil WEA of the first resolver 6 and the excitation coil WEB of the second resolver 7.

Specifically, the correction computation section 61 computes the current maximum amplitudes of the output signals of the respective phases of the first resolver 6, or the current maximum amplitudes α', on which the influence of temperature changes is reflected, by using the following equations.

$$\alpha' = As/\sin \theta a \quad (10)$$

$$\alpha' = Ac/\cos \theta a \quad (11)$$

As shown in the equations (1), (2), the amplitude As of the sin phase output signal Va1 is proportionate to the sinusoidal component (sin θa) of the rotation angle θa, and the amplitude Ac of the cos phase output signal Va2 is proportionate to the cosine component (cos θa) of the rotation angle θa. Therefore, by dividing the amplitude As of the sin phase output signal Va1 by the sinusoidal component of the rotation angle θa, or by dividing the amplitude Ac of the cos phase output signal Va2 by the cosine component of the rotation angle θa, the current maximum amplitude α' is computed. The equations (10), (11) are used together for allowing the current maximum amplitude α' to be computed even if the equation sin θa=0 or the equation cos θa=0 is satisfied.

The correction computation section 61 sets the maximum amplitude (specific maximum amplitude) of the output signals of the respective phases in the case where there is no influence of temperature change as α0, and computes the correction factor R by using the following equation.

$$R = \alpha 0/\alpha' \quad (12)$$

That is, if the specific transformation ratio of the first resolver 6 is represented by k0, and the transformation ratio that has changed due to a temperature change is represented by k', the specific maximum amplitude α0 and the current maximum amplitude α' are represented by the following equations.

$$\alpha 0 = k0 \times Vs \quad (13)$$

$$\alpha' = k' \times Vs \quad (14)$$

By substituting the equations (13), (14) into the equation (12), the following equation is obtained.

$$R = k0/k' \quad (15)$$

That is, based on the amplitudes As, Ac of the inputted output signals of the respective phases, the correction computation section 61 computes the inverse (k0/k') of the rate of change of the transformation ratio k due to a temperature change as the correction factor R. The excitation signal generation section 21 multiplies the excitation signal Vex by the correction factor R, thereby outputting the excitation signal Vex' of an amplitude that is obtained by multiplying the amplitude Vs of the excitation signal Vex before correcting by k0/k'. Thus, the current maximum amplitude α' of each phase of each output signal of the first resolver 6 becomes equal to the specific maximum amplitude α0 and constant.

In this embodiment, the corrected excitation signal Vex' is outputted to the second resolver 7. Since the correction factor R changes in accordance only with the specific transformation ratio k0 common to the first resolver 6 and the second resolver 7, and the transformation ratio k', which changes due to temperature changes, the current maximum amplitude β' of the output signals of the respective phases of the second resolver 7 becomes constant regardless of movement of the rotor core 14.

Accordingly, the torque detection apparatus 1 prevents the amplitudes of the output signals of the resolvers 6, 7 from being decreased by reduction of the transformation ratio k due to a temperature change, thereby maintaining the high resolution. As a result, the torque detection apparatus 1 can perform a highly accurate detection regardless of temperature changes.

According to this embodiment, the following advantages are obtained.

(1) The rotor core 14 of the second resolver 7 moves along the axial direction in response to rotation of the steering shaft 2. Based on a change of the transformation ratio kb of the second resolver caused by a change of the relative positions of the stator core 16 and the rotor core 14 along the axial direction due to the movement of the rotor core 14, the multiple rotation amount computation section 54 computes the first multiple rotation amount N of the steering shaft 2. The multiple rotation amount accumulation section 56 detects the switchover point of the absolute angle θ0 when the steering shaft 2 is rotated a single rotation, and uses a value representing the accumulation of the detection to compute the second multiple rotation amount N'. The abnormality determination section 58 performs abnormality determination based on the first and second multiple rotation amounts N, N'. That is, the abnormality determination section 58 determines whether the first and second multiple rotation amounts N, N' are equal to each other (N=N', step 101). When the first and second multiple rotation amounts N, N' are not equal to each other (step 101: NO), the abnormality determination section 58 determines that there is an abnormality in the torque sensor 3 (step 102).

That is, as the rotor core 14 of the second resolver 7 moves along the axial direction in response to rotation of the steering shaft 2, the relative positions of the stator core 16 and the rotor core 14 along the axial direction changes. Accordingly, the transformation ratio kb of the second resolver 7 changes. Therefore, by detecting the rate of change γ of the transformation ratio kb, the first multiple rotation amount N of the steering shaft 2 that is greater than or equal to a single rotation is detected. Then, the computed first multiple rotation amount N is compared to the second multiple rotation amount N', which is accumulated according to the detection of the absolute angle θ0 when the steering shaft 2 is rotated a single rotation. This permits an abnormality to be detected at an early stage.

(2) Based on the relationship between the electrical angles of the output signals of the first and second resolvers 6, 7, the absolute angle computation section 53 computes the absolute angle θ0 within a single rotation of the steering shaft 2. Based on the absolute angle θ0 within a single rotation and the computed first multiple rotation amount N, the θh computation section 55 computes the first multiple rotation absolute angle θh. Like the θh computation section 55, the θh' computation section 57 computes the second multiple rotation absolute angle θh' based on the absolute angle θ0 within a single rotation and the computed second multiple rotation amount N'.

The abnormality determination section 58 computes the first and second steering wheel turning speeds ω, ω', which are the angular velocities of the first and second multiple rotation absolute angles θh, θh' (step 103, 104). Then, the abnormality determination section 58 determines whether the first and second steering wheel turning speeds ω, ω' are each greater than the predetermined threshold value ω0. Based on the combination of the determination results, the abnormality determination section 58 identifies the cause of the abnormality (location of the abnormality).

The threshold value ω0 is set to the maximum value of values that normally occur as the angular velocity of the steering shaft 2. Then, based on the first and second multiple rotation amounts N, N', which have been computed in different manners, and the common absolute angle θ0 within a single rotation, the first and second multiple rotation absolute angles θh, θh' are computed. Then, whether the absolute value of each of the angular velocities (ω, ω') is greater than the threshold value ω0 is determined. Accordingly, whether the first and second multiple rotation absolute angles θh, θh' have abnormal values is determined. The properties unique to the configurations for calculating the elements that are basis for computing the first and second multiple rotation absolute angles θh, θh', that is, the absolute angle θ0 within a single rotation, and the first and second multiple rotation amounts N, N' are considered, so that the cause of the abnormality can be identified based on the combination of the determination results.

(3) The abnormality determination section 58 determines whether the absolute value of the first steering wheel turning speed ω is less than or equal to threshold value ω0, and the absolute value of the second steering wheel turning speed ω' is greater than the threshold value ω0 (|ω|≦ω0, and |ω'|>ω0, step 105). When the absolute values of the first and second steering wheel turning speeds ω, ω' meet this determination condition (step 105: YES), the abnormality determination section 58 determines that the second multiple rotation absolute angle θh' has an abnormal value due to the influence of noise (step 106). In this case, the abnormality determination section 58 resets the second multiple rotation amount N' to the first multiple rotation amount N, which has been computed based on the rate of change γ of transformation ratio kb due to movement of the rotor core 14 along the axial direction. That is, the abnormality determination section 58 makes the equation N'=N to be satisfied, thereby renewing the value of the second multiple rotation amount N' stored in the memory 59 (step 107).

That is, since the absolute value of the first steering wheel turning speed ω is a normal value (|ω|≦ω0), it is presumed that the absolute angle θ0 within a single rotation, which is commonly used for computing the first and second multiple rotation absolute angles θh, θh', has a normal value. Further, when the second multiple rotation amount N', which is the basis for computing the second multiple rotation absolute angle θh', is accumulated, the accumulated value of the second multiple rotation amount N' may be greatly different from the actual value due to the influence of noise. Thus, when only the absolute value of the second steering wheel turning speed ω' based on the second multiple rotation absolute angle θh' has an abnormal value (|ω'|>ω0), it is determined that the second multiple rotation absolute angle θh', which is the basis for computing the second steering wheel turning speed ω', has an abnormal value due to the influence of noise. Then, by renewing the second multiple rotation amount N' to the first multiple rotation amount N, the second multiple rotation amount N' is corrected to a correct value.

(4) The abnormality determination section 58 determines whether the absolute value of the first steering wheel turning speed ω is greater than the threshold value ω0, and the absolute value of the second steering wheel turning speed ω' is less than or equal to the threshold value ω0 (|ω|>ω0, and |ω'|≦ω0, step 108). When the absolute values of the first and second steering wheel turning speeds ω, ω' meet this determination condition (step 108: YES), the abnormality determination section 58 determines that there is an abnormality in the movable parts that move the rotor core 14 in the axial direction (step 109).

That is, since the absolute value of the second steering wheel turning speed ω' has a normal value (|ω'|≦ω0), it is presumed that, as in the above case, the absolute angle θ0 within a single rotation has a normal value, and the first multiple rotation amount N, which is computed based on the rate of change γ of the transformation ratio kb due to movement of the rotor core 14 along the axial direction, has an abnormal value. Therefore, it is determined that movement of the rotor core 14 along the axial direction does not correspond to rotation of the steering shaft 2, that is, there is an abnormality in the movable parts that move the rotor core 14 along the axial direction.

(5) The abnormality determination section 58 determines whether the absolute values of the first and second steering wheel turning speeds ω, ω' are both greater than the threshold value ω0 (|ω|>ω0, and |ω'|>ω0, step 110). When the absolute values of the first and second steering wheel turning speeds ω, ω' meet this determination condition (step 110: YES), the abnormality determination section 58 determines that there is an abnormality in at least one of the resolvers 6, 7 (step 111). Specifically, the abnormality determination section 58 determines that there is a broken wire or a short circuit in a coil of the first resolver 6 or the second resolver 7.

That is, since the absolute values of the first and second steering wheel turning speeds ω, ω' both have an abnormal value, it is presumed that the absolute angle θ0 within a single rotation, which is commonly used for computing the first and second multiple rotation absolute angles θh, θh', has an abnormal value. Therefore, the output signals from the resolvers 6, 7, which are used for computing the absolute angle θ0 within a single rotation, already has an abnormal value, and an abnormality such as a broken wire or a short circuit has occurred in the first resolver 6 or the second resolver 7.

The above embodiment may be modified as follows.

In the above embodiment, the present invention is applied to the torque detection apparatus for the electric power steering (EPS) having the twin resolver type torque sensor 3 that has the first and second the resolvers 6, 7. However, the present invention may be applied to an angle detection apparatus that has no torque detecting function.

The present invention may be applied to an angle detection apparatus having a single resolver, and the single resolver may be used for detecting the absolute angle in a single rotation and a multiple rotation amount. The computation unit 4 of the above embodiment detects the rate of change γ of the transformation ratio kb of the second resolver 7 based on the amplitudes Bs, Bc of the output signals of the respective phases of the second resolver 7 and the amplitudes As, Ac of the output signals of the respective phases of the first resolver 6. Instead, the multiple rotation amount may be detected based only on the rate of change of the transformation ratio in a resolver, in which the relative positions of a rotor core and a stator core change in response to rotation of a rotary shaft.

The computation unit 4 of the above embodiment corrects the excitation signal Vex to be outputted to the excitation coils WEA, WEB of the resolvers 6, 7, such that the maximum amplitudes α, β of the output signals of the respective phases from the resolvers 6, 7 become constant. However, the computation unit 4 does not need to have the function for correcting the excitation signal Vex.

The rotor core 14 of this embodiment moves along the axial direction in response to rotation of the steering shaft 2 (second shaft portion 9). Instead, the stator core 16 may move in the axial direction. In this case also, the relative positions of the rotor core 14 and the stator core 16 along the axial direction change in response to rotation of the steering shaft 2.

The structure for changing the relative positions of the rotor core and the stator core along the axial direction may be provided in the first resolver 6 in the input section.

In the above embodiment, the multiple rotation absolute angle of the steering shaft 2 is detected based on the first multiple rotation absolute angle θh computed by the θh computation section 55. However, the multiple rotation absolute angle of the steering shaft 2 may be detected based on the second multiple rotation absolute angle θh' computed by the θh' computation section 57.

The invention claimed is:

1. An angle detection apparatus having a resolver that has a transformation ratio, wherein, based on an output signal from the resolver, the angle detection apparatus detects an absolute angle of a rotary shaft that has a switchover point of absolute angles in a single rotation, wherein the resolver includes:

a rotor core that rotates integrally with the rotary shaft and has a rotor coil, the rotor coil being excited with an excitation signal having a predetermined amplitude; and a stator core that is located outside the rotor core, wherein a sensor coil is wound around the stator core, the sensor coil outputting an output signal having an amplitude that is proportionate to the amplitude of the excitation signal, wherein the resolver is configured such that, in response to rotation of the rotary shaft, the relative positions of the rotor core and the stator core along an axial direction of the rotary shaft change, wherein the transformation ratio is changed according to changes in the relative positions;

wherein the angle detection apparatus further comprises:

a multiple rotation amount computation section that computes a first multiple rotation amount of the rotary shaft based on a change in the transformation ratio;

a multiple rotation amount accumulation section that detects the switchover point, thereby accumulating a second multiple rotation amount of the rotary shaft; and an abnormality determination section that performs abnormality determination of the angle detection apparatus based on whether the first multiple rotation amount and the second multiple rotation amount are equal to each other.

2. The angle detection apparatus according to claim 1, wherein the angle detection apparatus detects an absolute angle in a single rotation of the rotary shaft, computes a first multiple rotation absolute angle over multiple rotations of the rotary shaft based on the absolute angle in a single rotation and the first multiple rotation amount, and computes a second multiple rotation absolute angle over multiple rotations of the rotary shaft based on the absolute angle in a single rotation and the second multiple rotation amount, wherein the abnormality determination section determines whether the absolute values of first and second angular velocities of the rotary shaft, the angular velocities corresponding to the first and second multiple rotation absolute angles, are greater than a threshold value, and wherein the abnormality determination section identifies the cause of an abnormality based on the combination of the determination results.

3. The angle detection apparatus according to claim 2, wherein, when the absolute value of the first angular velocity is less than or equal to the threshold value, and the absolute value of the second angular velocity is greater than the threshold value, the abnormality determination section renews the second multiple rotation amount to the first multiple rotation amount.

4. The angle detection apparatus according to claim 2, further comprising a movable member that changes the relative positions of the rotor core and the stator core, wherein, when the absolute value of the first angular velocity is greater than the threshold value, and the absolute value of the second angular velocity is less than or equal to the threshold value, the abnormality determination section determines that there is an abnormality in the movable member.

5. The angle detection apparatus according to claim 2, wherein, when the absolute values of the first and second angular velocities are both greater than the threshold value, the abnormality determination section determines that there is an abnormality in the resolver.

6. A detection apparatus for detecting an input torque applied to a rotary shaft having a switchover point of absolute angles in a single rotation based on output signals from first and second resolvers each having a transformation ratio, the rotary shaft including first and second shaft portions and a torsion bar coupling the shaft portions to each other, wherein the first resolver includes:

a first rotor core that rotates integrally with the first shaft portion and has a first rotor coil, the first rotor coil being excited with an excitation signal having a predetermined amplitude; and a first stator core that is located outside the first rotor core, wherein a first sensor coil is wound around the first stator core, the first sensor coil outputting an output signal having an amplitude that is proportionate to the amplitude of the excitation signal, wherein the first resolver is configured such that the relative positions of the first rotor core and the first stator core are fixed with respect to an axial direction of the first shaft portion, wherein the second resolver includes:

a second rotor core that rotates integrally with the second shaft portion and has a second rotor coil, the second rotor coil being excited with the excitation signal common to the first resolver; and a second stator core that is located outside the second rotor core, wherein a second sensor coil is wound around the second stator core, the second sensor coil outputting an output signal having an amplitude that is proportionate to the amplitude of the excitation signal, wherein the second resolver is configured such that, in response to rotation of the second shaft portion, the relative positions of the second rotor core and the second stator core along an axial direction of the second shaft portion change, wherein the transformation ratio of the second resolver is changed according to changes in the relative positions, wherein the detection apparatus further comprises:

a multiple rotation amount computation section that computes a first multiple rotation amount of the rotary shaft based on a change in the transformation ratio of the second resolver;

a multiple rotation amount accumulation section that detects the switchover point, thereby accumulating a second multiple rotation amount of the rotary shaft; and an abnormality determination section that performs abnormality determination of the detection apparatus based on whether the first multiple rotation amount and the second multiple rotation amount are equal to each other, wherein the detection apparatus detects a rotation angle of each shaft portion based on an output signal of the corresponding resolver, and wherein based on the difference between the rotation angles of the shaft portions, the detection apparatus detects a rotation torque applied to the rotary shaft.

7. The detection apparatus according to claim 6, wherein the detection apparatus detects an absolute angle in a single rotation of the rotary shaft, computes a first multiple rotation absolute angle over multiple rotations of the rotary shaft based on the absolute angle in a single rotation and the first multiple rotation amount, and computes a second multiple rotation absolute angle over multiple rotations of the rotary shaft based on the absolute angle in a single rotation and the second multiple rotation amount, wherein the abnormality determination section determines whether the absolute values of first and second angular velocities of the rotary shaft, the angular velocities corresponding to the first and second multiple rotation absolute angles, are greater than a threshold value, and wherein the abnormality determination section identifies the cause of an abnormality based on the combination of the determination results.

8. The detection apparatus according to claim 7, wherein when the absolute value of the first angular velocity is less than or equal to the threshold value, and the absolute value of the second angular velocity is greater than the threshold value, the abnormality determination section renews the second multiple rotation amount to the first multiple rotation amount.

9. The detection apparatus according to claim 7, further comprising a movable member that changes the relative positions of the second rotor core and the second stator core,
wherein, when the absolute value of the first angular velocity is greater than the threshold value, and the absolute value of the second angular velocity is less than or equal to the threshold value, the abnormality determination section determines that there is an abnormality in the movable member.

10. The detection apparatus according to claim 7, wherein, when the absolute values of the first and second angular velocities are both greater than the threshold value, the abnormality determination section determines that there is an abnormality in at least one of the first and second resolvers.

11. The detection apparatus according to claim 6, wherein the second resolver has a specific transformation ratio that is the same as that of the first resolver,
wherein, as the output signal, the first and second resolvers each output a two-phase signal that includes a sin phase output signal proportionate to a sinusoidal component of a rotation angle of the rotary shaft, and a cos phase signal proportionate to a cosine component of the rotation angle, and
wherein the multiple rotation amount computation section computes sums of squares of the output signals of the respective phases of the first and second resolvers, and wherein, based on the sums of squares, the multiple rotation amount computation section computes the ratio of the transformation ratio of the second resolver after a change in the relative positions to the transformation ratio of the second resolver prior to the change in the relative positions.

12. The detection apparatus according to claim 11, further comprising an excitation signal generation section for generating the excitation signal, and a correction section for correcting the excitation signal,
wherein the correction section corrects the excitation signal such that the maximum amplitude of the output signals of the first resolver is constant.

* * * * *